Aug. 12, 1952 — N. R. SIEBERT — 2,607,012
RADIOGRAPHIC INSPECTION DEVICE
Filed June 10, 1950
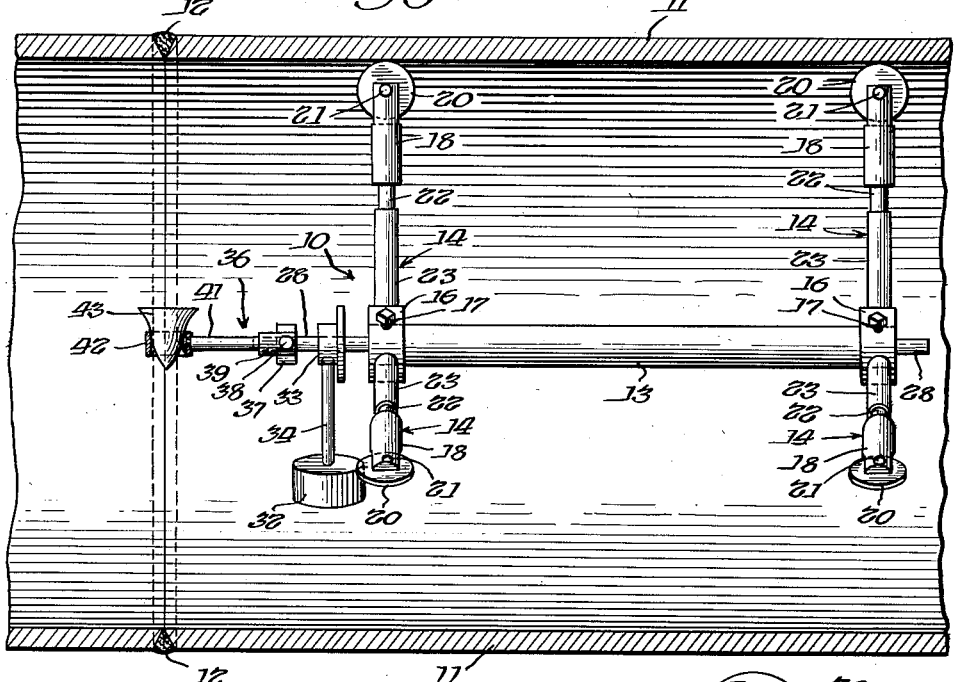
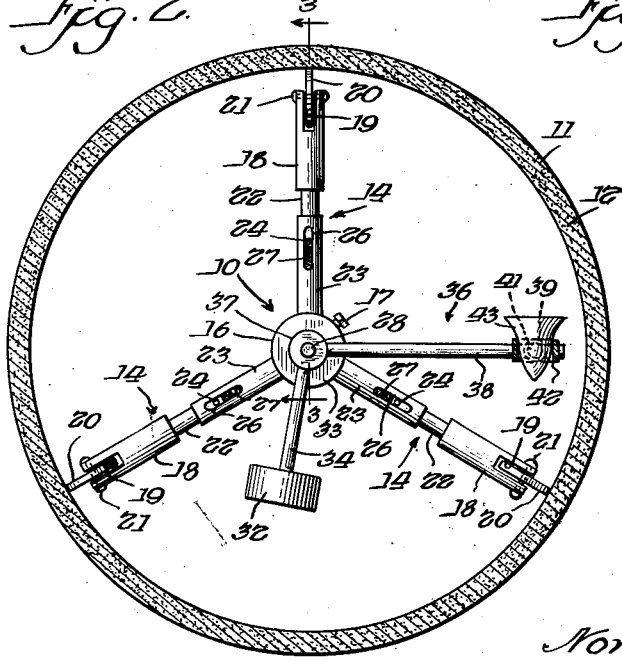
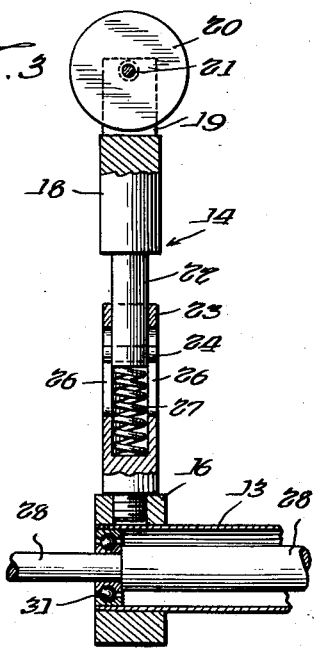
Inventor.
Norman R. Siebert.

Patented Aug. 12, 1952

2,607,012

UNITED STATES PATENT OFFICE 2,607,012

RADIOGRAPHIC INSPECTION DEVICE

Norman R. Siebert, Chicago, Ill., assignor to Crane Co., Chicago, Ill., a corporation of Illinois Application June 10, 1950, Serial No. 167,350

4 Claims. (Cl. 250—106)

1

This invention pertains to a radiographic inspection device. More particularly, it is adaptable for inspection of normally partially enclosed vessels or objects such as a length of pipe or tubing. More specifically, it pertains to a portable radiographic inspection device or carriage which is self-adjusting in positioning a radioactive substance within a length of pipe or the like.

To appreciate this inventive contribution, it should be understood at the outset that a desirable and useful application of this device lies in connection with the radiographic inspection of such items as circumferential pipe welds, for example, where normally the inner periphery thereof for purposes of such inspection is not readily accessible. It has long been a problem to accurately and conveniently position a radiographic substance within a pipe during the radioactive inspection of pipe welds. One of the major factors present in the aforementioned problem is the requirement of desirable radiographic inspection practice wherein the focal distance, i. e., the distance from radioactive substance to the radiographic film, should be seven times the thickness of the said weld. This requirement will prevent locating the radioactive substance in the center of a pipe in most cases. Instead, the proper focal distance may be attained only by locating the radioactive substance near the inner periphery of the weld and radiographing a diametrically opposite section of the said weld.

It is, therefore, an object of this invention to provide an economical radioactive substance holding device conveniently and quickly adaptable for use in shop or field in the radiographic inspection of circumferential pipe welds, cross-sections, or the like.

Another object is to provide a radiographic inspection device, the holder of which is self-adjusting in the positioning of a radioactive substance inside the normally closed object to be thus inspected.

Other objects and advantages will become more readily apparent upon reading the following description in light of the accompanying drawings, in which, Fig. 1 is a side elevational view of a preferred embodiment of this invention positioned within a pipe.

Fig. 2 is an end elevation view of the invention as shown in Fig. 1.

Fig. 3 is a sectional view taken on the line 3—3 of Fig. 2.

Similar reference numerals refer to similar parts throughout the several views.

2

As shown more clearly in Fig. 1, the preferred embodiment of this invention consists essentially of a holder device 10 positioned within a pipe 11 having a circumferential weld 12 therein. The carriage portion of the holder 10 is shown with a horizontal tube 13 which has mounted on each end thereof, preferably a plurality of radially extending supports 14 spaced angularly apart as illustrated on a cylindrical member 16 which is fixedly secured to the tube 13 by means of a screw 17. Each of the extending supports 14 is provided with an end section 18 having a slot 19 and an axle pin 21 suitable to receive and secure a wheel 20, thereby to provide for the desired longitudinal movement of the holder unit 10 within the pipe 11.

Preferably, the supports 14 may be telescopically adjustable and spring loaded, as best shown in Fig. 3. The end section 18 contains an axially mounted inwardly extending circular portion 22 which telescopes with the inner section 23 of the support 14. Projecting transversely through the inner end of the portion 22 is a pin 24 which is slidable within the diametrically opposite longitudinal slots 26 located in the section 23. Resilient means, such as the compression coil spring 27, normally maintains the support 14 in a fully extended position.

The aforementioned arrangement of support 14 provides for limited interchangeability in using the holder 10 within pipes of different internal diameter, and it provides, more particularly, for self alignment of the holder 10 in applications wherein the pipe bore or internal surface may be rough. For greater interchangeability of the holder 10 with different pipe diameters, the supports 14 may be removed from the member 16 and replaced by supports of suitable length.

Concentrically mounted within the tube 13 to extend therethrough, is a circular rod 28 which is rotatably supported at each end of the tube 13 by means of conventional ball bearings 31. With the latter described floating shaft arrangement, it should be noted that it will thus be possible to effect desirable relative axial rotation between the tube 13 and the inner rod 28.

To obtain the latter benefit, a pendulum is located at a reduced end portion of the rod 28, where a weight 32 suspended therefrom by means of a collar 33 is relatively non-rotatably mounted over the rod 28, and a suspension member 34 which is suitably connected to the collar 33 and weight 32. Separately mounted on the said reduced end portion of the rod 28 is a holder arm 36 to receive and hold a radioactive substance or the like.

The latter unit comprises a collar 37 which is adjustably mounted to rotatably slide on the rod 28 and support an extension rod 38 which extends transversely to rod 28. A coupling member 39 connects the rod 38 to a longitudinally extending arm 41 which connects with a ring 42 used to hold the radioactive substance capsule 43 relatively near the inner periphery of the weld 12. The rod 38 may easily be removable and replaced by a rod of different length, if the particular pipe to be inspected does not receive the holder arm 36.

It should be clear that the holder arm 36, as herein described, may be replaced by a single radially extending rod (not shown) which will suitably position a radioactive substance or the like inspection medium in the desired plane of the weld 12. The said rod could extend radially forward from the collar 37 to the shown position of the ring 42.

It should here be understood that the holder arm rod 38 may be predeterminately set in a radial direction with respect to the rod 28, and the ring 42, carrying the radioactive substance, may be rotatably adjusted on the arm 41, as desired.

Thus, with these preliminary settings made, the device is ready for actual use. The holder device 10 is inserted into an end of the pipe 11 wherein the holder is suitably guided and gaged until the radioactive substance is positioned in the desired plane relative to the weld 12, as shown in Fig. 1. Any rotation of the tube 13 during the positioning of the holder 10 will not affect the position of the holder arm 36 which is relatively rotatably mounted with respect to the tube 13 and, for the reasons previously described, is counterbalanced by the pendulum-like weight 32 which maintains the desired setting of the rod 28. Thus, a radiograph may now be conveniently taken of a diametrically opposite section of the weld 12. The holder 10 is then withdrawn from the pipe 11, the rod 38 is adjustably set in another desired or predetermined position, and the foregoing inspection procedure is repeated until the entire inner circumference of the weld 12 has been radiographed.

Thus, it will be clear that a relatively simple, conveniently portable device has been provided which lends itself readily to useful employment in a manner not heretofore permitted by prior devices.

Although this invention has been described in but one specific form, it is not intended to so limit it as it is susceptible to changes without departing from the spirit of the inventive concept or the scope of the appended claims.

I claim:

1. A radiographic inspection device including a stabilized substance positioner of the character described, the combination comprising a carriage member with radially extending supporting means engaging the wall of the article to be inspected, a rotatable shaft within the said carriage member, counterweight means substantially transversely mounted in fixed position relative to said rotatable shaft and cooperating with the said shaft to maintain the same in a constant rotative position relative to the article being inspected when the latter is rotated, a radially extending holder arm cooperating with the said rod in fixed angular relation to the counterweight, the holder arm member having means adjacent the portion to be inspected for receiving a substance such as radium which is to be positioned for facilitating the inspection of a pipe, vessel, or the like.

2. A self-stabilizing radiographic inspection device for pipes, vessels, and the like, the combination comprising a carriage member having a plurality of radially extending means for contact with the pipe or vessel interior, a centrally positioned rotatable rod connected to the said radially extending means of the said carriage, a radially extending holder arm mounted on the rotatable rod and cooperating with the said radially extending means to support an inspection medium such as radium, a counterbalance in fixed angular relation to the rotatable rod and cooperating with an end portion of the said centrally positioned rotatable rod whereby the said rod and holder arm may be maintained in a selected rotative position relative to the pipes, vessels, and the like upon predetermined rotation of the latter on the central axis during inspection.

3. A self-stabilizing holder inspection device for positioning an inspection substance within a pipe or the like to be inspected, the combination comprising a carriage member, resiliently mounted radially extending means on the said carriage member for adjustably supporting the said carriage member within a pipe, a rotatable rod centrally forming a mounting for the said resiliently mounted means, a tubular cover for the said rotatable rod, a radium substance holder arm extending radially from the said rod and having an end substance holder means relatively near the inner periphery of the said pipe, counterweight means rotatably movably with said rod to influence the axial rotation thereof relative to the said tubular cover.

4. A self-stabilizing inspection device for use in radiographic inspection of pipe or the like, comprising a carriage having radially disposed rollers and a resilient mounting therefor, an elongated enclosure forming a central portion of the carriage, a rod mounted within the said enclosure to be axially rotatable relative to the said enclosure, radially disposed inspection substance holding cup-like member connected to the said rod and counterweight means attached to the said rod to inhibit rotation of the said rod relative to rotation of the pipe being inspected.

NORMAN R. SIEBERT.

REFERENCES CITED

The following references are of record in the file of this patent:

UNITED STATES PATENTS

| Number | Name | Date |
|---|---|---|
| 1,935,740 | Gette, Jr. | Nov. 21, 1933 |
| 2,340,923 | Boucher | Feb. 8, 1944 |
| 2,378,237 | Morris | June 12, 1945 |